(12) United States Patent
Christmas

(10) Patent No.: US 11,567,317 B2
(45) Date of Patent: Jan. 31, 2023

(54) PUPIL EXPANSION

(71) Applicant: Envisics Ltd, Milton Keynes (GB)

(72) Inventor: Jamieson Christmas, Milton Keynes (GB)

(73) Assignee: Envisics Ltd.

( * ) Notice: Subject to any disclaimer, the term of this patent is extended or adjusted under 35 U.S.C. 154(b) by 0 days.

(21) Appl. No.: 17/179,152

(22) Filed: Feb. 18, 2021

(65) Prior Publication Data

US 2021/0255459 A1    Aug. 19, 2021

(30) Foreign Application Priority Data

Feb. 19, 2020    (GB) ...................................... 2002275

(51) Int. Cl.
  *G02B 27/01*    (2006.01)
  *F21V 8/00*     (2006.01)
  *G02B 27/00*    (2006.01)

(52) U.S. Cl.
  CPC ......... *G02B 27/0101* (2013.01); *G02B 6/002* (2013.01); *G02B 6/003* (2013.01); *G02B 27/0081* (2013.01); *G02B 2027/0125* (2013.01)

(58) Field of Classification Search
  CPC ................ G02B 27/0101; G02B 27/01; G02B 27/0081; G02B 2027/0125; G02B 2027/0174
  See application file for complete search history.

(56) References Cited

U.S. PATENT DOCUMENTS 6,278,534 B1    8/2001 Arns
10,599,098 B2 *  3/2020 Favalora ................. H04N 13/32
(Continued)

FOREIGN PATENT DOCUMENTS

EP    2784569 A1    10/2014
JP    2019-522811 A   8/2019
(Continued)

OTHER PUBLICATIONS

Hainich and Bimber, Displays: Fundamentals and Applications, 2011, "NearEye Displays", pp. 439-503.
(Continued)

*Primary Examiner* — Thomas A Hollweg
*Assistant Examiner* — Mary A El-Shammaa
(74) *Attorney, Agent, or Firm* — McDonnell Boehnen Hulbert & Bergthoff LLP

(57) ABSTRACT

There is disclosed herein a waveguide comprising an optical slab and an optical wedge. The optical slab has a first refractive index, $n_1>1$. The optical slab comprises: a pair of opposing surfaces and an input port. The pair of opposing surfaces are arranged in a parallel configuration. The input port is arranged to receive light into the optical slab at an angle such that the light is guided between the first and second opposing surfaces by a series of internal reflections. The optical wedge has a second refractive index, $n_2$, wherein $1<n_2<n_1$. The optical wedge comprises a pair of opposing surfaces arranged in a wedge configuration. A first surface of the optical wedge abuts the second surface of the optical slab to form an interface that allows partial transmission of light guided by the optical slab into the optical wedge at a plurality of points along the interface such that the light is divided a plurality of times. The angle of the wedge allows light received at the interface to escape through the second surface of the optical wedge such that the exit pupil of the waveguide is expanded by the plurality of divisions of the light.

18 Claims, 18 Drawing Sheets

(56) References Cited

U.S. PATENT DOCUMENTS

| | | | |
|---|---|---|---|
| 10,634,919 B2* | 4/2020 | Alexander | G02B 27/0172 |
| 10,690,916 B2* | 6/2020 | Popovich | G02B 6/0016 |
| 10,795,235 B2* | 10/2020 | Frank | G03H 1/02 |
| 10,838,132 B1* | 11/2020 | Calafiore | G02B 6/0015 |
| 2012/0224062 A1 | 9/2012 | Lacoste et al. | |
| 2015/0153569 A1 | 6/2015 | Yonekubo | |
| 2015/0355461 A1 | 12/2015 | Kessler et al. | |
| 2016/0041387 A1 | 2/2016 | Valera et al. | |
| 2017/0315358 A1 | 11/2017 | Masuda | |
| 2017/0329137 A1 | 11/2017 | Tervo | |
| 2018/0095284 A1* | 4/2018 | Welch | G02B 27/0172 |
| 2019/0340435 A1* | 11/2019 | Rabinovich | G06N 3/08 |
| 2021/0026135 A1* | 1/2021 | Ishii | G02B 6/001 |
| 2021/0255459 A1* | 8/2021 | Christmas | G02B 27/0081 |

FOREIGN PATENT DOCUMENTS

| | | | | |
|---|---|---|---|---|
| WO | 2017/142774 A1 | 8/2017 | | |
| WO | 2017/200780 A1 | 11/2017 | | |
| WO | WO-2018175653 A1 * | 9/2018 | | G02B 27/0172 |

OTHER PUBLICATIONS

Combined Search and Examination Report dated Nov. 11, 2020 for Great Britain Application No. GB2002275.2, 12 pages.

* cited by examiner

PUPIL EXPANSION

CROSS-REFERENCE TO RELATED APPLICATIONS

This application claims the benefit of priority of United Kingdom Patent Application no. 2002275.2, filed Feb. 19, 2020, which is hereby incorporated herein by reference in its entirety.

FIELD

The present disclosure relates to a pupil expander such as a waveguide pupil expander. More specifically, the present disclosure relates to a slab waveguide pupil expander for the picture generating unit of a head-up display. The present disclosure also relates to a projector and a method of projection such as holographic projection. Some embodiments relate to a head-up display and a method of increasing the viewing window or eye-motion-box of a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic display device, such as a holographic projector, may be provided using the system described herein. Such projectors have found application in head-up displays, "HUD".

SUMMARY

There is disclosed herein a waveguide comprising an optical slab and an optical wedge. The optical slab has a first refractive index, $n_1 > 1$. The optical slab comprises: a pair of opposing surfaces and an input port or, more simply, an "input". The pair of opposing surfaces are arranged in a parallel configuration. That is, a first surface and second surface of the optical slab are substantially parallel. The first surface comprises an input (port) that is arranged to receive light into the optical slab at an angle such that the light is guided between the first and second opposing surfaces by a series of internal reflections. Therefore, in embodiments, the first surface is not parallel to the second surface at the input (port). The optical wedge has a second refractive index, $n_2$, wherein $1 < n_2 < n_1$.

The optical wedge comprises a pair of opposing surfaces arranged in a wedge configuration. That is, a first surface and second surface of the optical wedge are non-parallel. The optical wedge has one relatively thick end and one relatively thin end. A first surface of the optical wedge abuts the second surface of the optical slab—and is substantially parallel to the second surface of the optical slab—to form an interface that allows partial transmission of light guided by the optical slab into the optical wedge at a plurality of points along the interface such that the light is divided a plurality of times. There is generally an acute angle between the first surface and the second surface of the optical wedge such that a distance, or separation, (in a direction substantially perpendicular to the first surface of the wedge) between the second surface and the first surface of the wedge decreases, as distance from the input end of the waveguide increases. Therefore, the second surface generally tapers to meet the first surface at a point, or apex, at an output end of the waveguide. The angle of the wedge allows light received at the interface to escape through the second surface of the optical wedge such that the exit pupil of the waveguide is expanded by the plurality of divisions of the light. Light is contained within the waveguide by total internal reflection at the interface between the first surface of the slab and the surrounding medium (e.g. air).

The first and second opposing surface of the optical slab are the light-guiding surfaces of the slab. That is, they are the surfaces that bounce the light therebetween by internal reflection in order to propagate the light from one end of the slab to the other in a manner that will be familiar to the person skilled in the art of optics. In this respect, it may be said that the first and second surfaces of the optical slab are the major surfaces of the optical slab. The word slab is used herein to reflect that the first and second surface are substantially planar and substantially flat. The person skilled in the art will be familiar with the optical slab having a propagation axis or propagation direction that indicates the general direction in which the light is guided even though the actual light ray path is a zig-zag between the two light-guiding surfaces. The pair of light-guiding surfaces of the optical slab are substantially parallel such that the angle of incidence on each bounce is constant.

A first (bottom) surface of the optical wedge abuts the second (top) surface of the optical slab. The first (bottom) surface of the optical slab and the second (top) surface of the optical wedge form an interface with a low refractive index material such as air. The refractive index of the material of the optical slab is higher than the refractive index of the material of the optical wedge. The interface between the slab and wedge generates a plurality of replicas of the light rays. The angled second (top) surface of the wedge allows the light way replicas to exit the waveguide. The exit pupil of the waveguide is expanded by forming a plurality of replicas of the light rays. The first (bottom) surface of the wedge receives light and the second (top) surface of the wedge transmits light. In this respect, it may be said that the first and second surfaces of the optical wedge are the major surfaces of the optical wedge. The term 'wedge' is used herein to reflect that component has a thick end that tapers down in thickness to a thin end. The taper may be linear or non-linear. The term wedge also reflects that there is an angle between the top surface and bottom surface.

The angle may be constant or varying with distance along the wedge. The angle of incidence on the first (bottom) surface of the wedge is different to the angle of incidence on the second (top) surface of the wedge. In embodiments described herein using a curved wedge surface, the angle of incidence of light on the first (bottom) surface of the wedge is greater than the angle of incidence of light on the second (top) surface of the wedge.

In embodiments, reflections from the first (bottom) surface of the optical slab satisfy the condition for total internal reflection—i.e. the angle of incidence is greater than the critical angle between the slab and air. In embodiments, reflections from the second (top) surface of the optical slab do not satisfy the condition for total internal reflection and therefore some light is transmitted by the interface between the slab and wedge. This is because the critical angle for the slab-wedge interface is greater than the critical angle for the slab-air interface because $1<n_2<n_1$. At each bounce from the slab-wedge interface, the light is divided. In embodiments, a plurality of divisions is provided for pupil expansion. The optical wedge functions to extract or couple light out of the waveguide. The bottom surface of the optical wedge breaks the condition for total internal reflection within the slab owing to having a higher refractive index than air. The transmissivity of the top surface of the optical wedge is increased by angling the top surface relative to the bottom surface. The waveguide of the present disclosure is not complex to fabricate and provides the technical advancement of reducing the intensity of the unwanted reflection from the top surface of the decoupling component.

A problem with waveguide pupil expanders is that the intensity of each replica is not the same because the light is continually being divided with each bounce. The inventor has addressed this problem by curving the top surface of the wedge. Specifically, the angle between the first and second opposing surface of the optical wedge changes with distance from the input (port). According to embodiments, the angle between the first and second opposing surface of the optical wedge is greater towards the input end and decreases towards the output end. In other words, the angle of the wedge is steeper towards the input end and less steep (or, shallower) towards the output end. Accordingly, the difference in intensity between the replicas can be compensated. In other words, the curvature at least partially compensates for the decreasing intensity of the replica with each bounce. In some cases, the intensity of the transmitted light at each division can be made substantially the same. The curvature compensates as described herein because the change (e.g. decrease) in angle of incidence with distance along the waveguide changes transmissivity—as the person skilled in the art will appreciate from their understanding of the Fresnel equations. In some embodiments, the second surface of the optical wedge forms a concave surface of the waveguide. In other embodiments, the second surface of the optical wedge forms a convex surface of the waveguide.

There is disclosed herein a head-up display comprising the waveguide in which the curved surface of the waveguide forms an angled cover glass or glare trap of the head-up display. The waveguide of the present disclosure therefore serves the additional purpose of managing sunlight reflections of the head-up display top surface.

In other embodiments, the top surface of the wedge is substantially flat. That is, the angle between the first and second opposing surface of the optical wedge is substantially constant with distance from the input (port).

In some embodiments, the refractive index of the optical wedge changes with distance from the input (port), optionally, increases with distance from the input (port). If the refractive index of the optical wedge increases with distance from the input, the corresponding difference between the refractive index of the optical wedge and the refractive index of the optical slab decreases with distance from the input, and so the amount of reflectance at the slab-wedge interface correspondingly decreases with distance. Accordingly, the proportion of light transmitted at the interface between the wedge and slab changes with distance from the input (port) of the slab. This refractive index gradient may at least partially compensate for the decreased intensity of each replica with distance from the input (port).

In an alternative embodiment, an index matching fluid layer is sandwiched between the optical slab and optical wedge. The refractive index of the index matching fluid may change with distance from the input (port). The refractive index of the index matching fluid may increase with distance from the input (port). Again, this would encourage a higher proportion of the remaining light to be transmitted, instead of being reflected into the slab at the slab-wedge interface, as distance from the input increases. The change in refractive index with distance along the interface may at least partially compensate for the decreased intensity of each replica with distance from the input (port).

In other examples, the optical wedge further comprises a graded coating—such as a graded opacity coating—that performs at least partial intensity correction. The graded coating may be dichroic. In other words, the graded coating at least partially compensates for the decreasing intensity of each replica with distance along the waveguide. For example, the opaqueness of the graded coating may decrease with distance along the waveguide.

In some embodiments, the optical slab comprises an output (or exit) port. The output port may be complementary to the input port such as opposing the input port. The output port may be at the opposite end of the optical slab to the input port. Light that has been transmitted from the input port to the other end of the slab (i.e. has remained inside the slab) may be removed from the optical slab through the output port in order to prevent, for example, unwanted back reflections. It may therefore be said that the optical slab includes an output port arranged to eject light from the optical slab. More specifically, the output port ejects light that has not been transmitted into the optical wedge.

There is also disclosed herein a display system—e.g. an image projector—including the waveguide and a picture generating unit arranged to display a pattern, wherein the light received by the input (port) is light of the pattern displayed by the picture generating unit.

The display system may further comprise an optical system between the picture generating unit and waveguide. The optical system may comprise at least one selected from the group comprising: a collimation lens, a pair of lens arranged to form a telescope such as a demagnifying telescope and a spatial filter. In some embodiments, the waveguide is arranged to receive collimated light or substantially collimated light.

The picture generating unit may be a holographic projector. The displayed pattern is a hologram such as a Fourier or Fresnel hologram. These embodiments are characterised by the absence of a screen between the display device—e.g. spatial light modulator—and viewer. These embodiments are sometimes called "direct view" because the viewer looks directly at the display device. It is sometimes said that, in these configurations, the eyes of the viewer perform a Fourier transform of the hologram.

The displayed pattern may be a picture corresponding to a hologram such as a holographically-reconstructed picture formed from a hologram. The light received by the waveguide is therefore light of a picture. It may be said that light rays of the picture are replicated by the waveguide. It is sometimes said in short that the picture is replicated by the waveguide. The picture may be formed on a screen such as a diffuse screen.

There is also disclosed herein a method of pupil expansion. The method comprises a first step of receiving light into an optical slab through an input port, wherein the optical slab has a first refractive index, $n_1>1$. The method comprises a second step of guiding the light between first and second opposing surfaces of the optical slab by a series of internal reflections, wherein the first and second opposing surfaces are arranged in a parallel configuration. The method comprises a third step of dividing the light a plurality of times by forming an interface between a first surface of an optical wedge and the second surface of the optical slab that allows partially transmission of the light into the optical wedge at a plurality of points along the interface, wherein the optical wedge has a second refractive index, $n_2$, and $1<n_2<n_1$. The method comprises a fourth step of arranging the first and a second opposing surface of the optical wedge in a wedge configuration so that light received by the optical wedge through the interface (i.e. through the first surface) escapes through the second surface of the optical wedge such that the exit pupil of the waveguide is expanded by the plurality of divisions of the light.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "writing" and "addressing" may be used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator.

Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
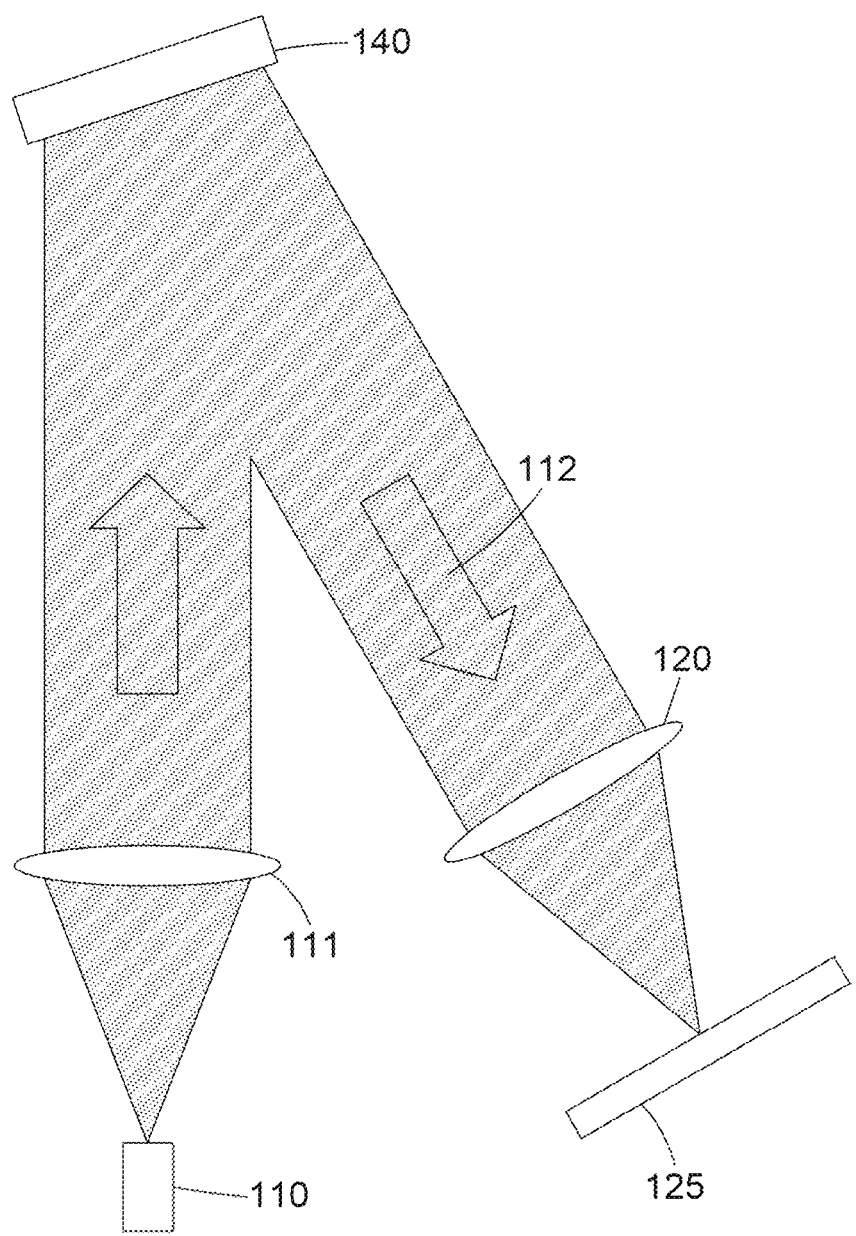
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved"

from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi$[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
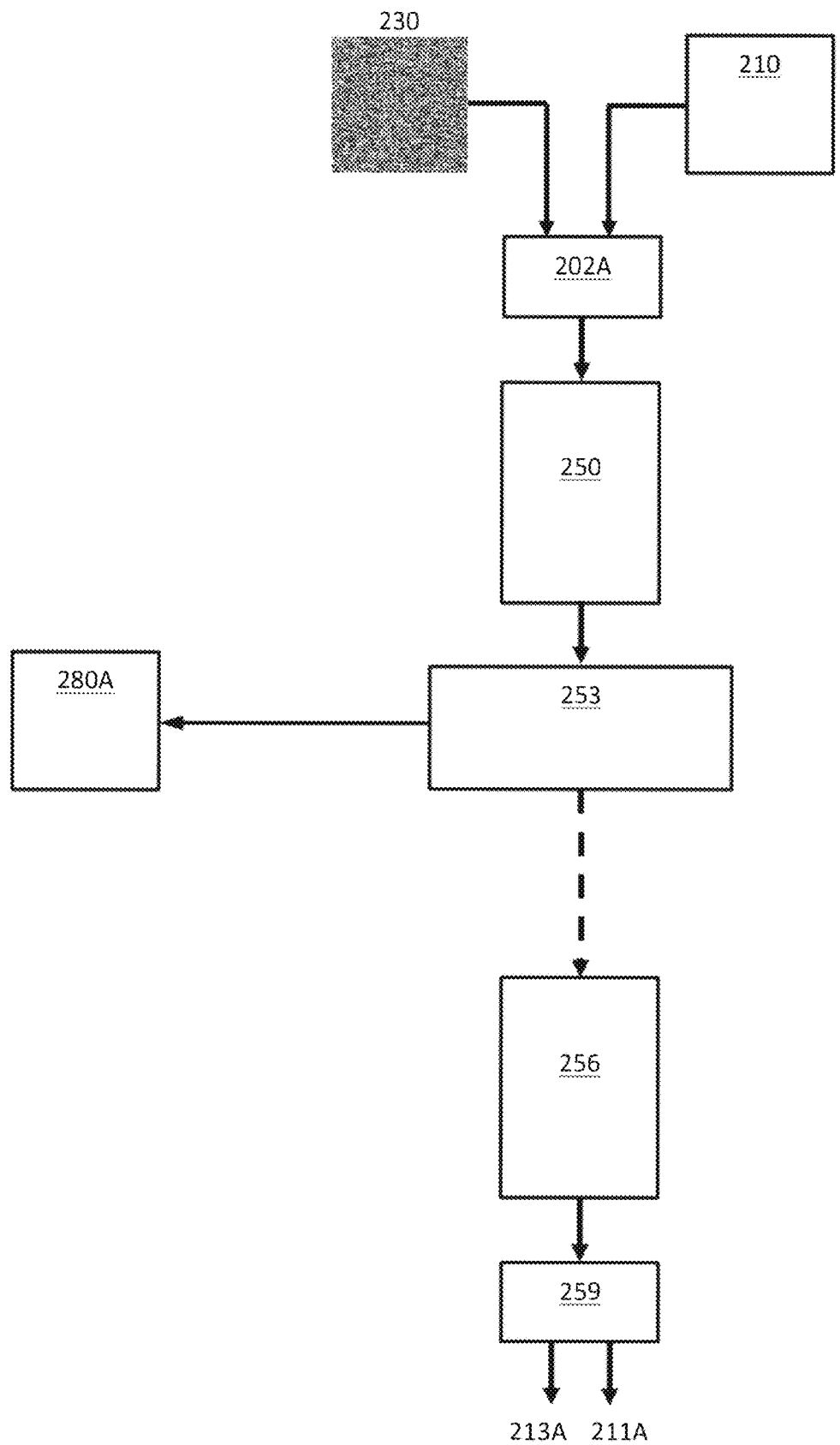
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
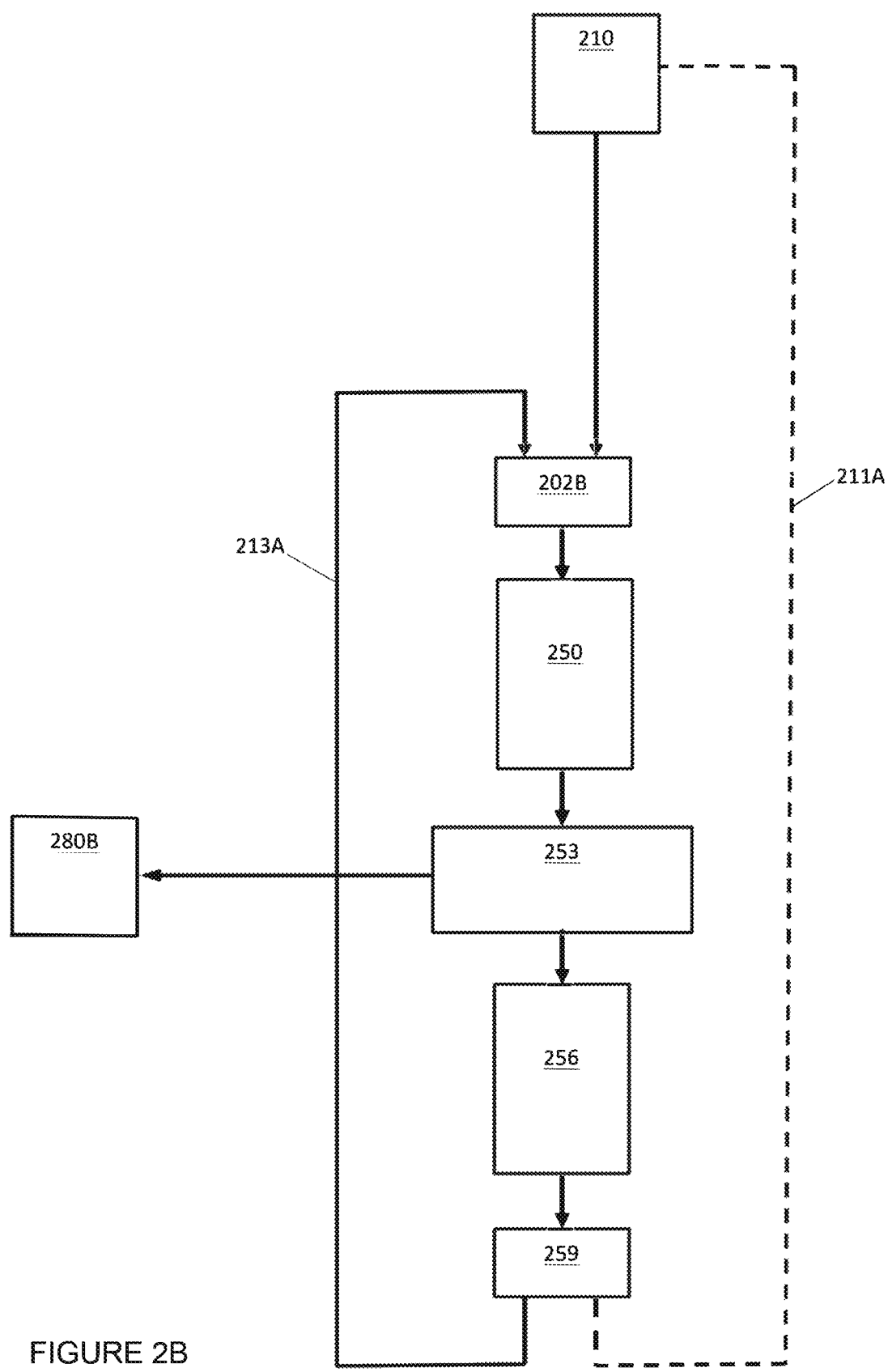
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
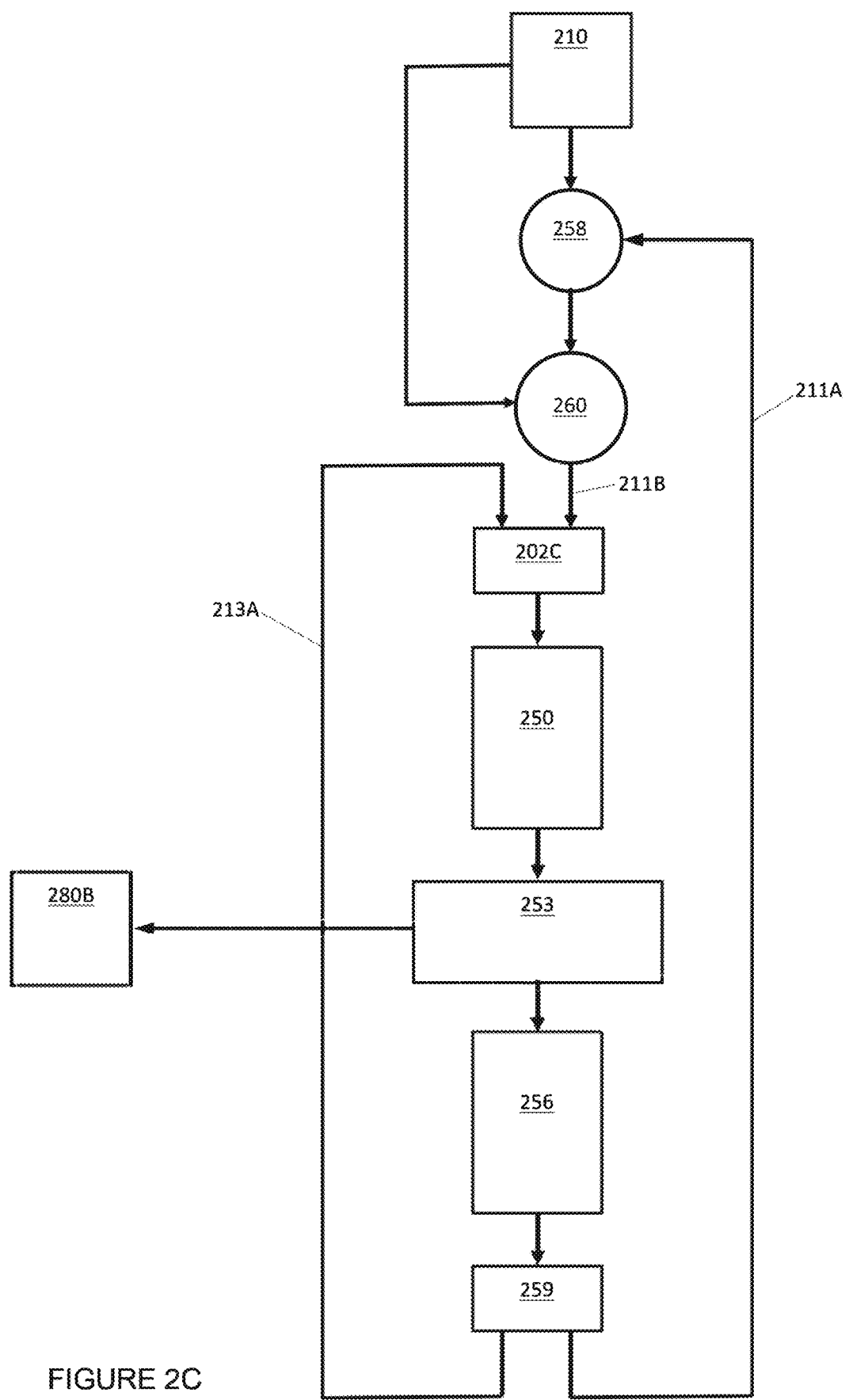
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
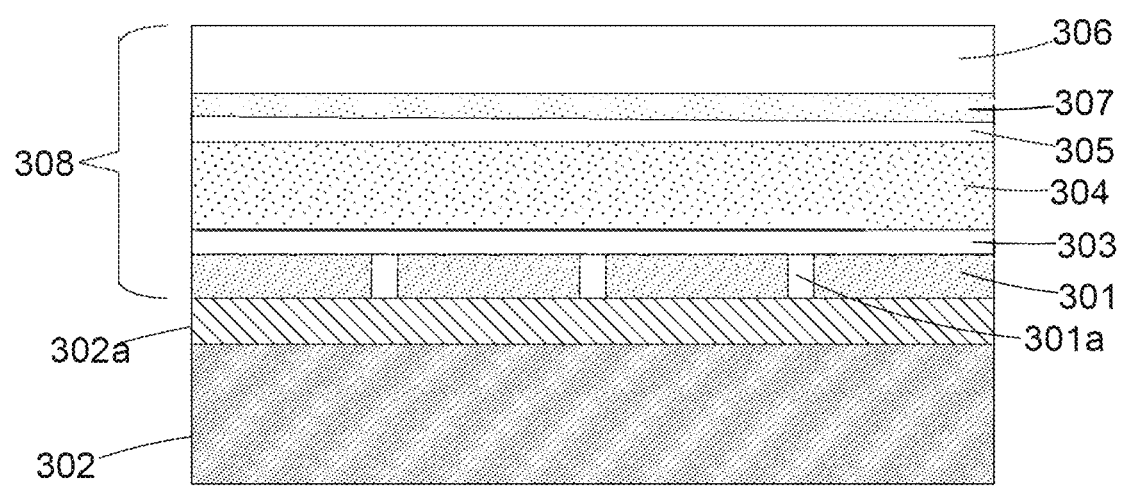
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Waveguide Pupil/Viewing Window Expander

In holographic projection systems such as head-up displays (HUDs), the area or volume in which a user's eyes can be located, in order to successfully view light emitted from the projection system, is known as the eye motion box (EMB), eye-box or, more generally, viewing window. The corresponding part of the projection system, which emits light towards the eye box, is known as the exit pupil. It is generally desirable to expand the exit pupil corresponding to the eye box region or viewing window. In particular, the viewer needs to be able to move his or her head around and so able to see the complete image from any position within a limited area at the eye box/viewing distance. Thus, a pupil expander may be employed to enlarge the EMB, eye-box or viewing window. Typically, the pupil expander enlarges the EMB by generating extra rays by division of the amplitude of the incident wavefront.

Figure 4:
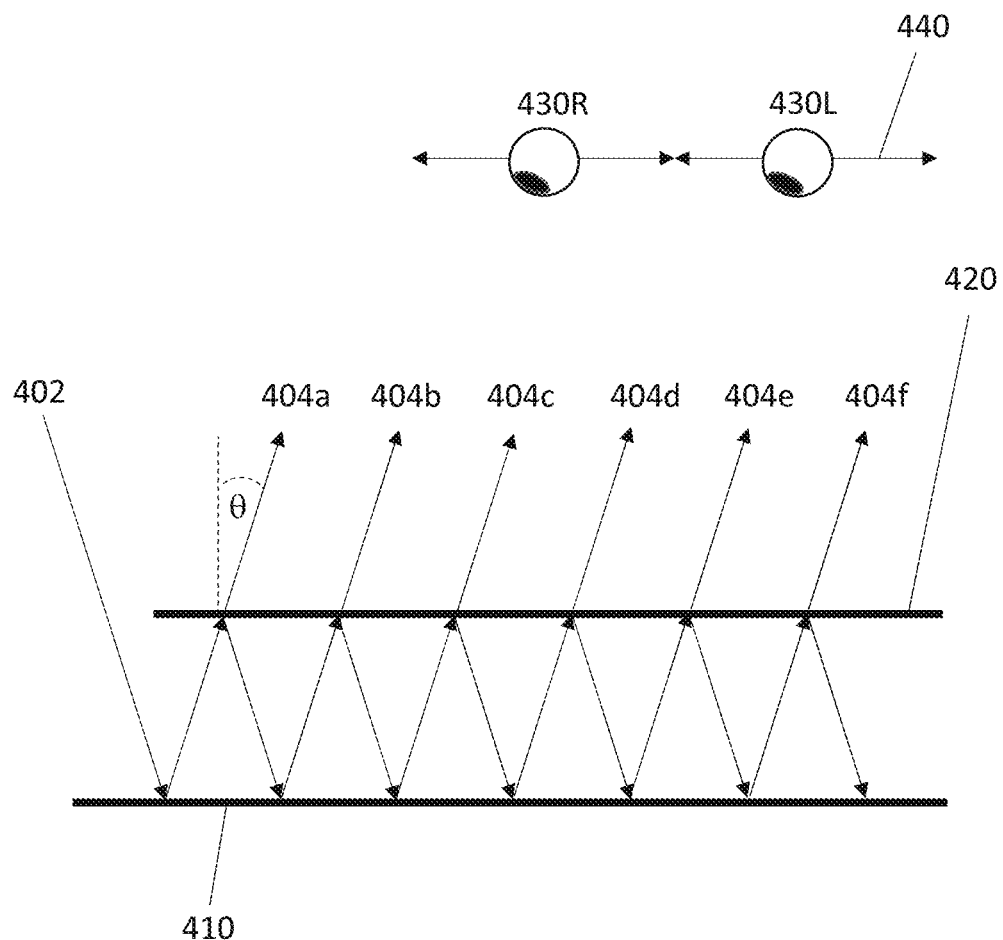
FIG. 4 shows an example pupil expander comprising a waveguide.

FIG. 4 illustrates an example pupil expander comprising a waveguide. In this example, the waveguide comprises two reflective surfaces but the description that follows is equally applicable to a slab configuration in which light is guided inside by the slab by internal reflections between the top and bottom surface of the slab. The general principle of a waveguide is known in the art and not described in detail herein. A waveguide guides light within a layer between a pair of parallel reflective surfaces by internal reflection. A pupil expander is formed from a waveguide comprising a first graded/partially reflective surface 420 (e.g. a graded mirror having varying reflectivity with distance) and a second fully reflective surface 410 (e.g. a mirror having substantially 100% reflectivity). In particular, first reflective surface 420 comprises a reflective coating the reflectivity of which decreases along the length of the slab. The layer may be glass or Perspex. The waveguide may therefore be a glass or Perspex block or slab. The first reflective surface may be a first surface of the glass block and the second reflective surface may be a second surface of the glass block, wherein the first surface is opposite and parallel to the second surface. Alternatively, the layer may be air and the first and second reflective surface may be separate components—e.g. a first and second mirrors spatially-separated to form an air gap within which light propagates by internal reflection.

Accordingly, as shown in FIG. 4, an input light beam 402 (which may comprise spatially modulated light encoded with a picture (i.e. light of a picture/image or, simply a picture) or spatially modulated light encoded with a hologram as described below) comprising input light rays enters the waveguide through an input port thereof. The waveguide is arranged to guide light received at the input port to a viewing window. In the illustrated arrangement, the input port comprises a gap in the first partially reflective surface 420 near one end of the waveguide, but other positions for the input port are possible. The viewing window is an area or volume within which a viewer may view an image as described herein. The angle of incidence of the input light beam 402 is such that the light rays propagate along the length of the waveguide due to internal reflection by first partially reflective surface 420 and second fully reflective surface 410. Example rays are illustrated in FIG. 4. Due to the graded reflectivity of first reflective surface 420, a proportion of light is transmitted by first reflective surface 420 to provide a plurality of output light rays 404a-f (herein called "replicas" because they replicate the input light rays) along the length of the waveguide. Thus, first reflective surface 420 forms a viewing surface. It is said that the pupil (or viewing window) is expanded by the replicas formed by the waveguide. In particular, by forming a plurality of replicas 404a-f along the length of the waveguide, the viewing window is increased in size. Each replica 404a-f corresponds to a proportion of the amplitude (intensity or brightness) of the input light beam 402. It is desirable that the grading provides a decrease in reflectivity (or conversely an increase in transmissivity) of the first reflective surface 420 along the length of the waveguide such that each replica 404a-f has substantially the same amplitude. Thus, a viewer having a right viewer eye 430R and left viewer eye 430L at the eye box at a viewing distance from the first reflective surface 420 is able to see the image at any position within an expanded viewing window, as illustrated by arrows 440.

The waveguide shown in FIG. 4 expands the viewing window in one dimension—corresponding to the lengthwise direction along which the light beam propagates within the waveguide—as shown by arrows 440. As the skilled person will appreciate, it is possible to expand the viewing window in two dimensions, when required, by using two orthogonal waveguides.

The first reflective surface 420 of the waveguide may be coated with a coating comprising a large number of thin films (e.g. 25 or more thin films) in order to provide the necessary graded reflectivity. In particular, as described above, such thin films or similar coatings need to provide decreasing reflectivity, and thus increasing transmissivity, with propagation distance such that the brightness (ray intensity) of each replica 404a-f is substantially constant. The amplitude of the propagating light beam reduces with propagation distance due to output of the replicas 404a-f and due to any other optical losses such as imperfect reflections from the second reflective surface 410. Thus, the grading of the first reflective surface 420 is designed to take into account the drop in intensity of the propagating light beam with propagation distance, whilst ensuring that each replica 404a-f has substantially the same intensity so that the image seen has uniform brightness throughout the viewing window (i.e. at all viewing positions).

Figure 5:
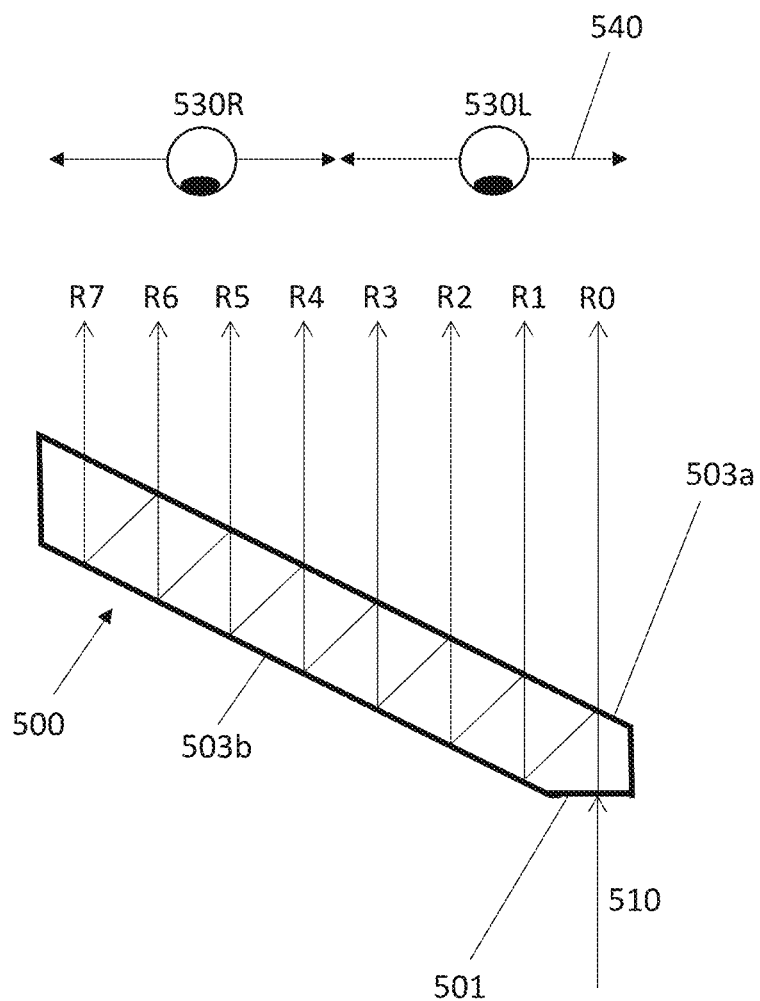
FIG. 5 shows a slab-type waveguide for pupil expansion.

FIG. 5 shows a slab waveguide 500 comprising an input port 501 arranged to receive input light 510 such as light of a picture or light of a hologram. The slab is made from a material having a refractive index greater than air. Light received into the slab 500 is guided by a series of internal reflections between a bottom surface 503b and an opposing top surface 503a. The bottom surface 503b may be a substantially perfect reflector—such as a mirror—and the top surface 503a may be mostly-reflective. The top surface 503a may allow some transmission of light. Accordingly, light generally propagates along the slab by internal reflection but a series of replicas, R0 to R7, of the light rays are formed owing to the partial transmissivity of the top surface 503a. The division of light (or replica of the light rays) shown in FIG. 5 functions to expand the exit pupil of the waveguide. Pupil expansion achieved by the light ray replicas allows a viewer, having a right eye 530R and left eye 530L, to move (as shown by arrows 540) within a viewing window area (or volume) whilst still receiving light of the picture—i.e. whilst still be able to see the picture, or hologram. As described with reference to FIG. 4, the reflectivity of the top surface decreases with distance from the input port so that the intensity of each replica, Ro to R7, is substantially the same. The so-called graded-reflectivity of the top surface 503a may be provided by a multilayer, dielectric coating. In practice, it is difficult to fabricate an adequate dielectric coating for high quality display—particularly, full colour display.

The present disclosure provides an improve waveguide based on a slab. For the avoidance of doubt, FIGS. 6, 7B and 8, which illustrate example system configurations in accordance with this disclosure, show a waveguide formed by two mirrors—rather than a slab with reflective coatings—by way of example only. The effects of light refraction are not fully illustrated in FIG. 5 to preserve simplicity but they will be well-understood by the person skilled in the art.

First Example System

Figure 6:
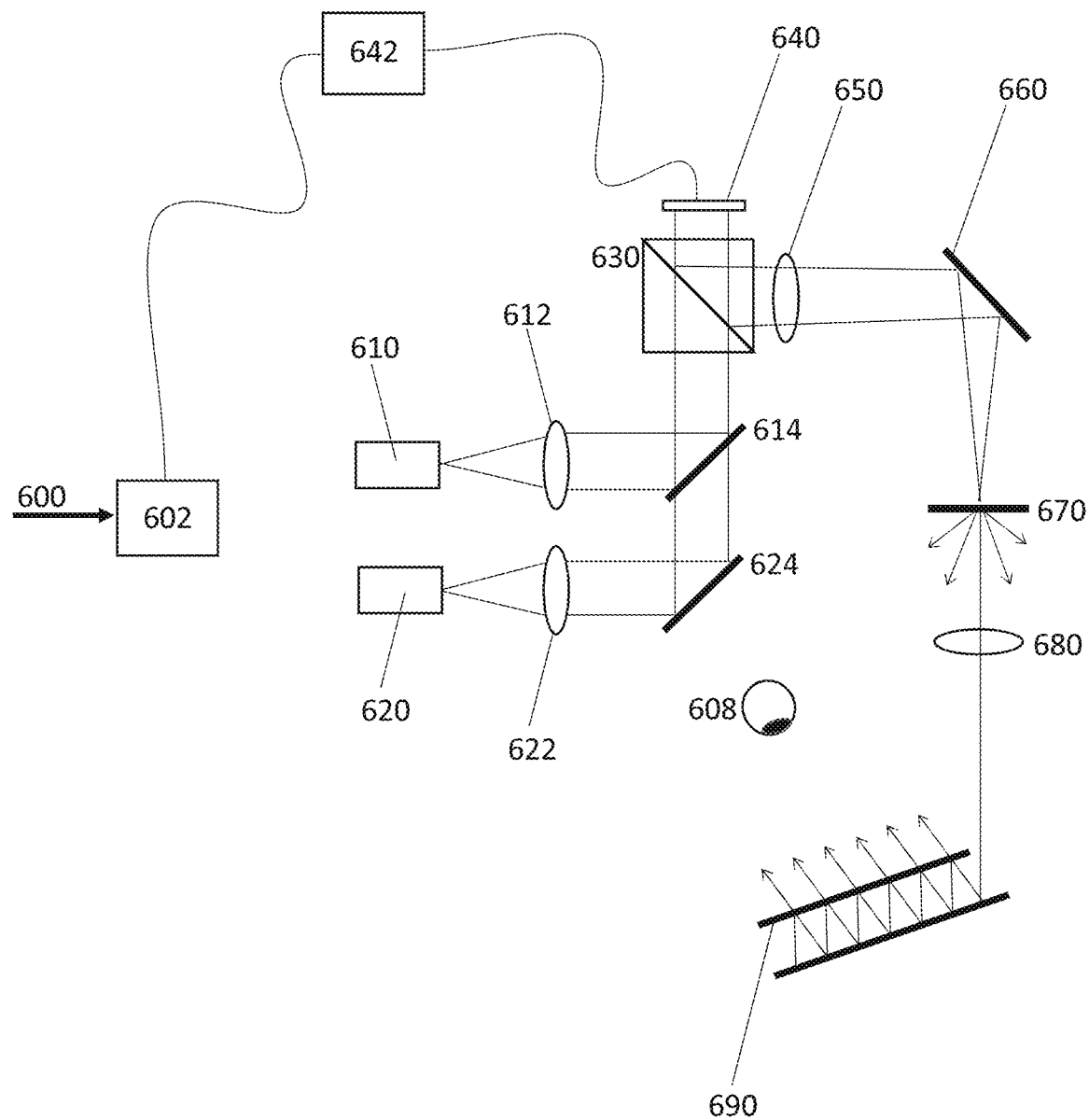
FIG. 6 shows a holographic display system comprising an example pupil expander.

FIG. 6 shows a holographic display system comprising a waveguide forming a waveguide pupil expander in accordance with first example system configuration. FIGS. 6 to 8 refer to colour projection systems by way of example only and the present disclosure is equally applicable to a monochromatic system.

Holographic display device comprises a picture generating unit arranged to form a first picture (also called "first image") and a second picture (also called "second image"). A first single colour channel (also called "first display channel") is arranged to form the first picture and comprises a first light source 610, a first collimating lens 612 and a first dichroic mirror 614. First dichroic mirror 614 is arranged to reflect light of a first wavelength along a common optical path so as to illuminate a spatial light modulator (SLM) 640. The first wavelength of light corresponds to the first display channel of a first colour (e.g. red). A second single colour channel (also called "second display channel") is arranged to form the second picture and comprises a second light source 620, a second collimating lens 622 and a second mirror 624. Second mirror 624 is arranged to reflect light of a second wavelength along the common optical path so as to illuminate the SLM 640. The second wavelength of light corresponds to the second single colour channel of a second colour (e.g. green). As described below, in other embodiments, the picture generating unit may comprises a third single colour/display channel (equivalent to the first and second channels) arranged to form a third picture, wherein the third colour channel corresponds to a wavelength of light of a third colour (e.g. blue). In the illustrated embodiment, SLM 640 comprises a single array of light modulating pixels (e.g. LCOS) that is illuminated by light of both the first and second wavelengths. In other embodiments, SLM 640 may comprise separate arrays of light modulating pixels that are illuminated by light of the respective first and second wavelengths.

Holographic display device further comprises a holographic controller 602 arranged to control the picture generating unit, specifically the light output by picture generating unit as described herein. First spatially modulated light of the first colour corresponding to the first picture is output by SLM 640 to form a first single colour image (e.g. red image) on a light receiving surface 670, such as a screen or diffuser. A first single colour computer-generated hologram is calculated by a holographic controller 602 and encoded on SLM 640, for example by a display driver 642. The SLM 640 displays the first hologram and is illuminated by light of the first colour from the first colour/display channel to form a first holographic reconstruction on the light receiving surface 670 which is positioned at the replay plane. Similarly, second spatially modulated light of the second colour corresponding to the second picture is output by SLM 640 to form a second single colour image (e.g. green image) on the light receiving surface 670. A second single colour computer-generated hologram is encoded on SLM 640 by holographic controller 602. The SLM 640 displays the second hologram and is illuminated by light of the second colour from the second colour/display channel to form a second holographic reconstruction on the light receiving surface 670 at the replay plane. In the illustrated arrangement, a beam splitter cube 630 is arranged to separate input light to SLM 640 and spatially modulated light output by SLM 640. A Fourier lens 650 and mirror 660 are provided in the optical path of the output spatially modulated light to light receiving surface 670. It may be said that a first/second picture is formed on the light receiving surface 670. The first/second pictures are first/second holographic reconstructions of the respective first/second holograms. Thus, a composite colour picture may be formed on light receiving surface 670 combining the first and second pictures. A projection lens 680 is arranged to project the first and second pictures formed on the light receiving surface 672 to an input port of a pupil expander in the form of a waveguide 690. A viewer 608 may view a magnified image of the pictures from the expanded eye box—the "viewing window"—formed by waveguide 690 owing to optical power of projection lens 680. Waveguide 690 comprises an optically transparent medium separated by first and second reflective surfaces as described above with reference to FIG. 4. Thus, holographic display device has an "indirect view" configuration—that is the viewer does not directly view the holographic reconstruction, but rather views pictures formed on light receiving surface 670. Holographic controller 602 may receive other external and internal inputs 600 for use in generating the computer-generated holograms as known in the art. Such inputs may determine the image content for display by the holographic display device.

The holographic display device illustrated in FIG. 6 has a picture generating unit comprising a first colour (e.g. red) display channel arranged to display a first single colour hologram and a second colour (e.g. green) display channel arranged to display a second single colour hologram, by way of example only. In example implementations, three or more display channels may be provided configured to display respective single colour holograms. For example, a full-colour composite image/picture may be formed by displaying respective red, green and blue single colour holograms. The present disclosure may be implemented using a picture generating unit comprising any number of single colour channels including just one colour channel.

Waveguide Geometry

Figure 7A:
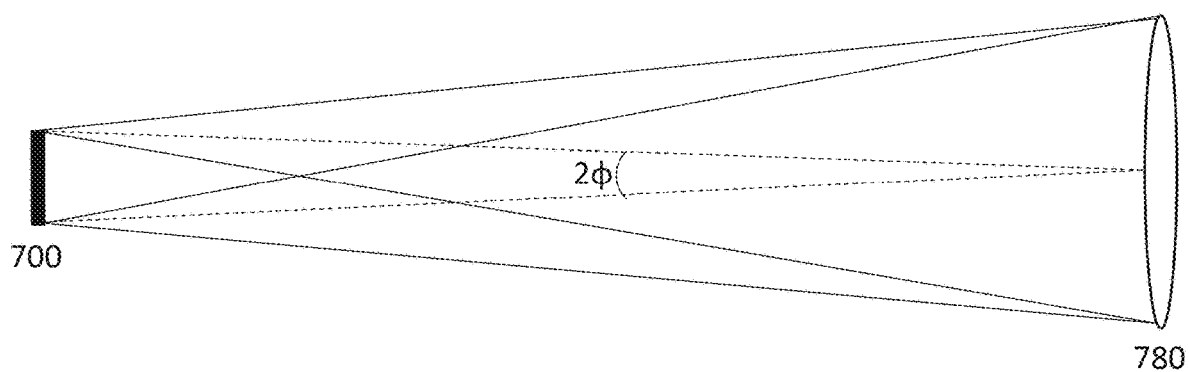
FIGS. 7A-C show the geometry of a pupil expander.
Figure 7B:
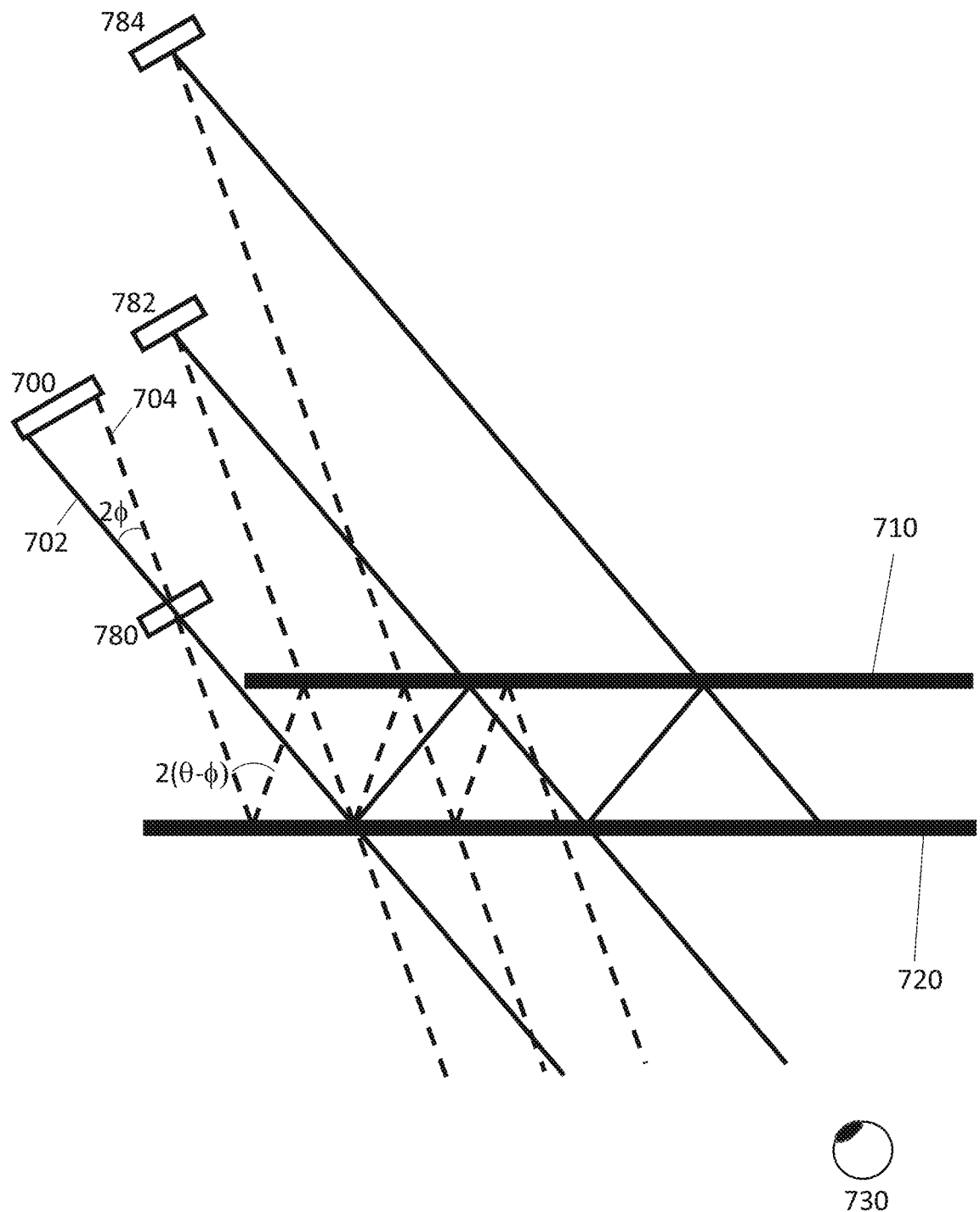
Figure 7C:
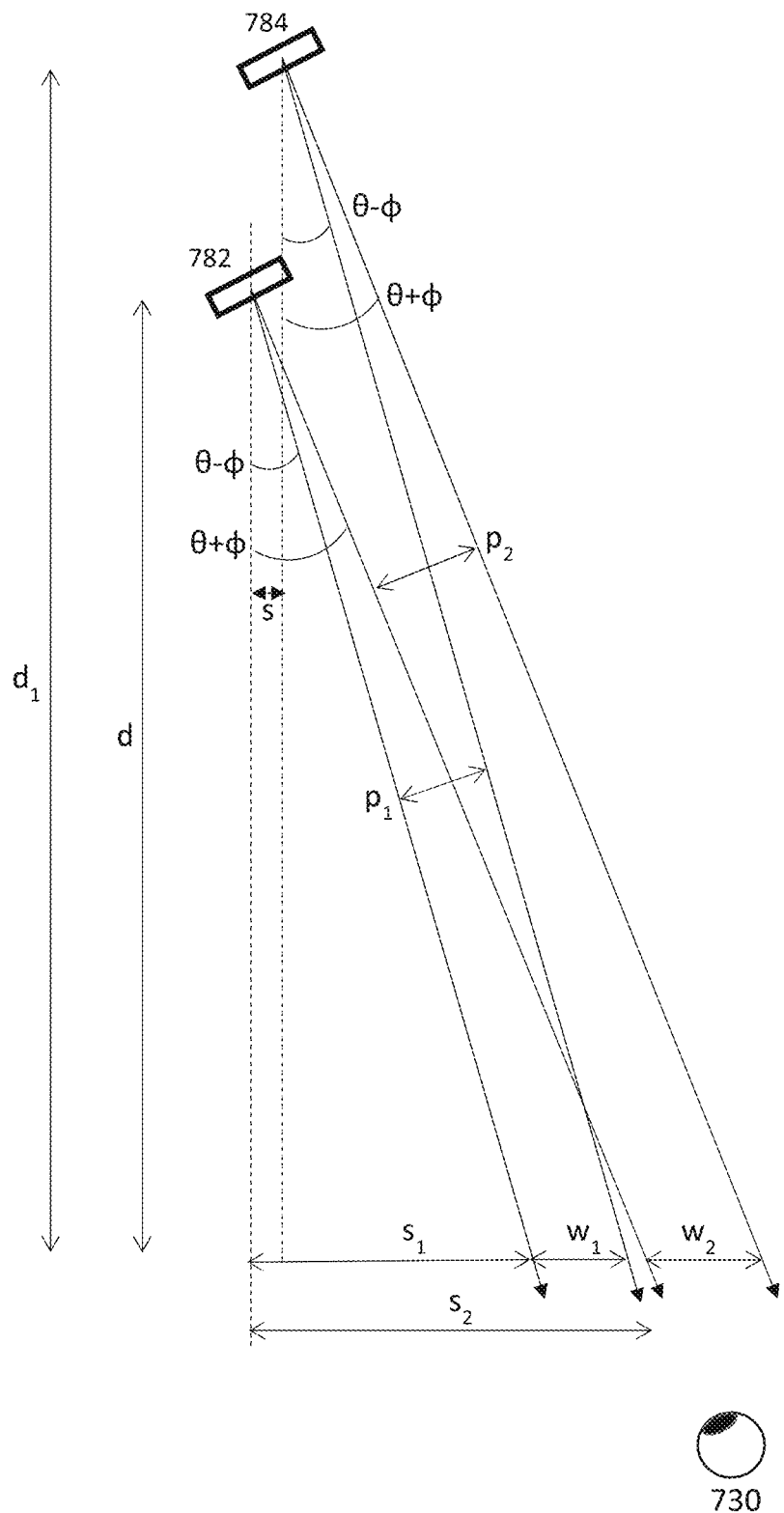
Figure 8:
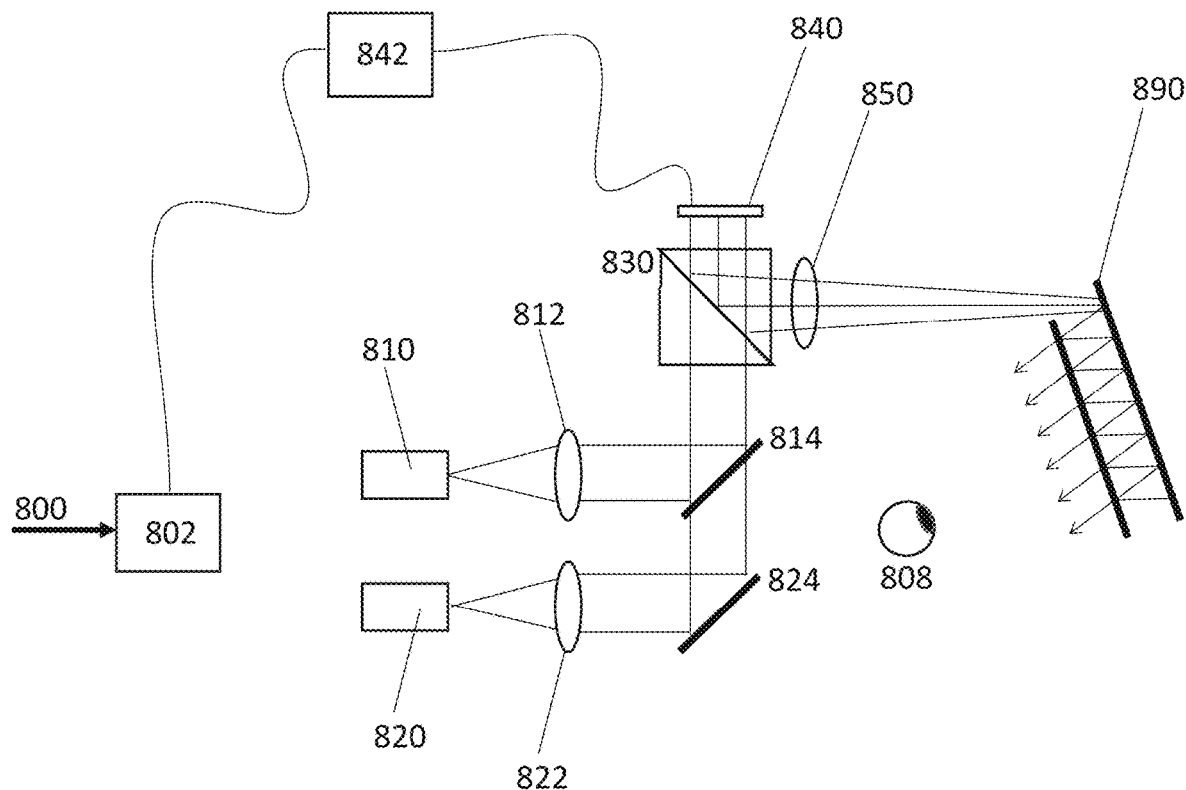
FIG. 8 shows a holographic display system comprising an example pupil expander.

FIGS. 7A-C show the geometry of the waveguide pupil expander in accordance with embodiments. In particular, FIGS. 7B and 7C show the positioning, and propagation along waveguide, of the chief rays of an input image beam 702 (as a described above) and the output of replicas visible to viewer 730. Waveguide comprises first partially reflective surface 720 and second fully reflective surface 710 as described above.

The geometry shown in FIG. 7C may be represented by the following equations.

$$w_1 = 2d\tan(\theta-\phi)$$

$$w_2 = 2d\tan(\theta+\phi)$$

$$p_1 = 2d\sin(\theta-\phi)$$

$$p_2 = 2d\sin(\theta+\phi)$$

$$\tan(\theta-\phi) = s_1/d = (s_1+w_1-s)/d_1$$

$$\tan(\theta+\phi) = s_2/d = (s_2+w_2-s)/d_1$$

$$s_1 d_1 = (s_1+w_1-s)d$$

$$s_1 \Delta d = 2d^2\tan(\theta-\phi) - sd \quad (1)$$

$$s_2 d_1 = (s_2+w_2-s)d$$

$$s_2 \Delta d = 2d^2\tan(\theta+\phi) - sd \quad (2)$$

Subtract (1) from (2)

$$\Delta d = 2d^2(\tan(\theta+\phi)-\tan(\theta-\phi))/(s_2-s_1)$$

Subtract $s_1(2)$ from $s_2(1)$ $$0 = 2s_2 d^2\tan(\theta-\phi) - ss_2 d - 2s_1 d^2\tan(\theta+\phi) - ss_1 d$$

$$s = (2s_2 d\tan(\theta-\phi) - 2s_1 d\tan(\theta+\phi))/(s_1+s_2)$$

$$= (s_2 w_1 - s_1 w_2)/(s_1+s_2)$$

Second Example System

FIG. 8 shows a holographic display system comprising waveguide pupil expander in accordance with second example system configuration.

The holographic display system illustrated in FIG. 8 is similar to the holographic display system of FIG. 6 but characterised by the absence of a screen between the spatial light modulator and viewing plane. Therefore, it is a direct-view configuration. In particular, holographic display device comprises a picture generating unit arranged to form a first picture (or first image) and a second picture (or second image). A first single colour/display channel (e.g. red colour channel) comprises a first light source 810, a first collimating lens 812 and a first dichroic mirror 814 arranged to illuminate SLM 840 with light of the first wavelength. A second single colour/display channel (e.g. green colour channel), comprises a second light source 820, a second collimating lens 822 and a second mirror 824 arranged to illuminate the SLM 840 with light of the second wavelength. The first display channel is arranged to form the first image (e.g. red image) at the eye 808 of the viewer. A first single colour computer-generated hologram is encoded on SLM 840 by a holographic controller 802. The SLM 840 displays the first hologram and is illuminated by light from the first colour channel to form a first holographic reconstruction on the light receiving surface 870 which is positioned at the replay plane. Similarly, the second display channel is arranged to form the second image (e.g. green image) at the eye 808 of the viewer. A second single colour computer-generated hologram is encoded on SLM 840 by holographic controller 802. The SLM 840 displays the second hologram and is illuminated by light from the second colour channel to form a second holographic reconstruction on the light receiving surface at the replay plane.

The holographic display device further comprises a beam splitter cube 830, arranged to separate input light to and output light from SLM 840. However, in contrast FIG. 6, the holographic display device is a direct view system. In the illustrated arrangement, a lens 850 is positioned in the optical path of the spatially modulated light output by SLM 840. Lens 850 is optional. A viewer 808 may directly-view the spatially modulated light from the spatial light modulator. In some embodiments, as described above, the lens of the viewer's eye forms a holographic reconstruction on the retina of the eye. In these embodiments, it may be said that the viewer receives spatially modulated light encoded with the hologram. In other embodiments, the viewer receives light of the picture or light encoded with the picture. The picture may be formed at an intermediate plane in free space. Waveguide 890 comprises an optically transparent medium separated by first and second reflective surfaces as described above. Thus, holographic display device has an "direct view" configuration—that is the viewer looks directly at the display device (i.e. spatial light modulator) and the light receiving surface of FIG. 6 is optional.

Slab and Wedge

Figure 9A:
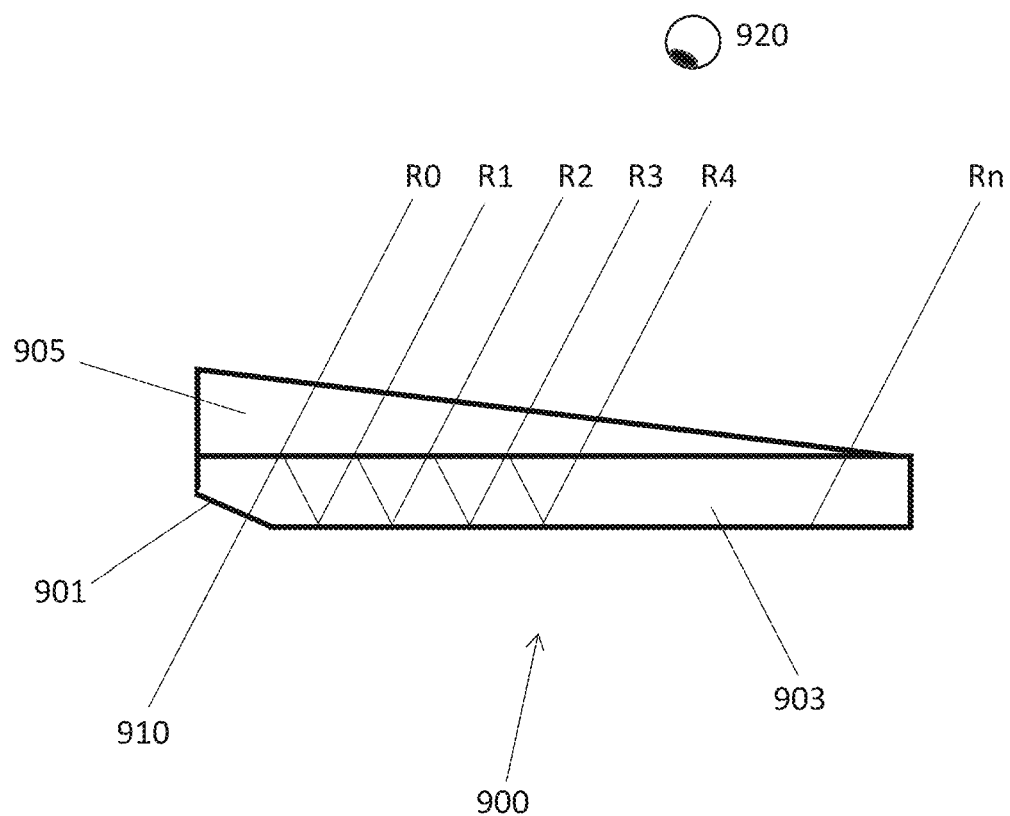
FIG. 9A show a waveguide comprising a linear-gradient wedge in accordance with embodiments.

FIG. 9A shows a waveguide 900 in accordance with embodiments. The waveguide 900 comprises an optical slab 903 similar to that described with reference to FIG. 5. However, in this embodiment, light is guided by the slab by internal reflection between a high refractive index material and a lower refractive index material at each bounce—rather than by applying reflective coatings to the top and bottom surfaces of the slab. More specifically, reflections from the bottom surface of the slab (lower surface in FIG. 9A) are total internal reflections satisfying the critical angle condition between the high refractive index material of the slab and the surrounding medium—e.g. air. The angle incidence on the bottom surface may be at least the critical angle. The person skilled in the art will understand how the injection angle of the light into the slab through input port 901, and the refractive index of the slab and surrounding medium (e.g. air) can be selected to achieve total interface reflection from bottom surface of slab 903.

Figure 10:
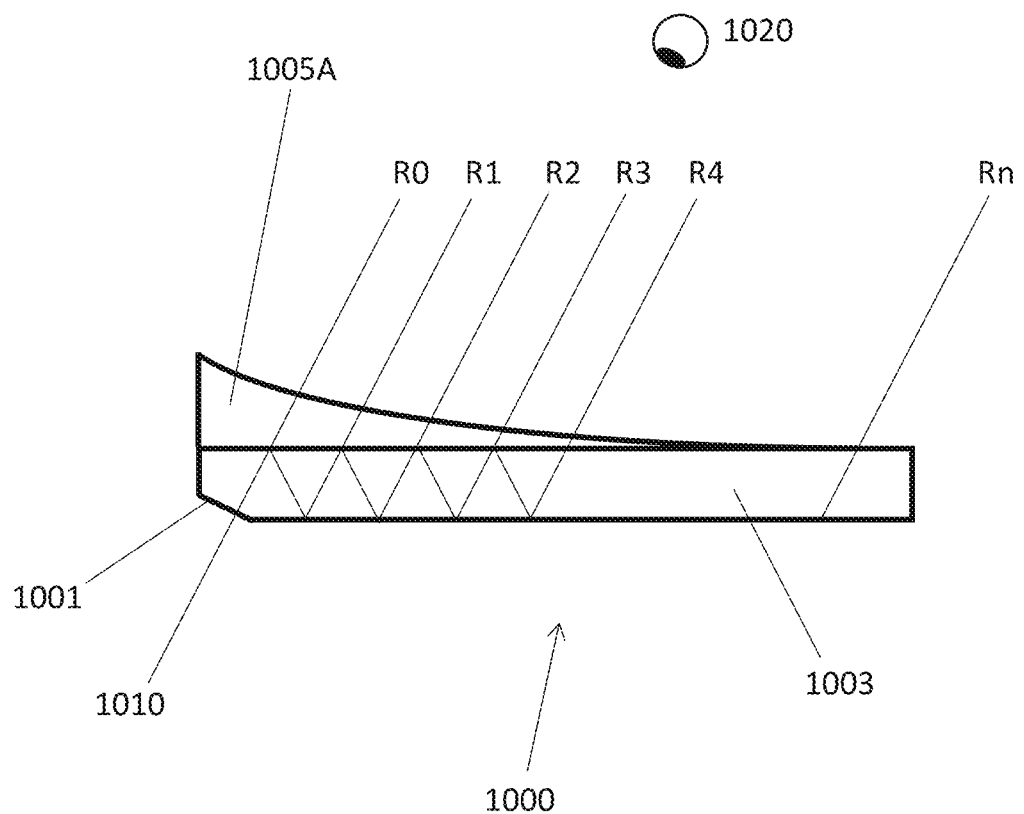
FIG. 10 shows a waveguide comprising a curved wedge in accordance with embodiments.
Figure 11:
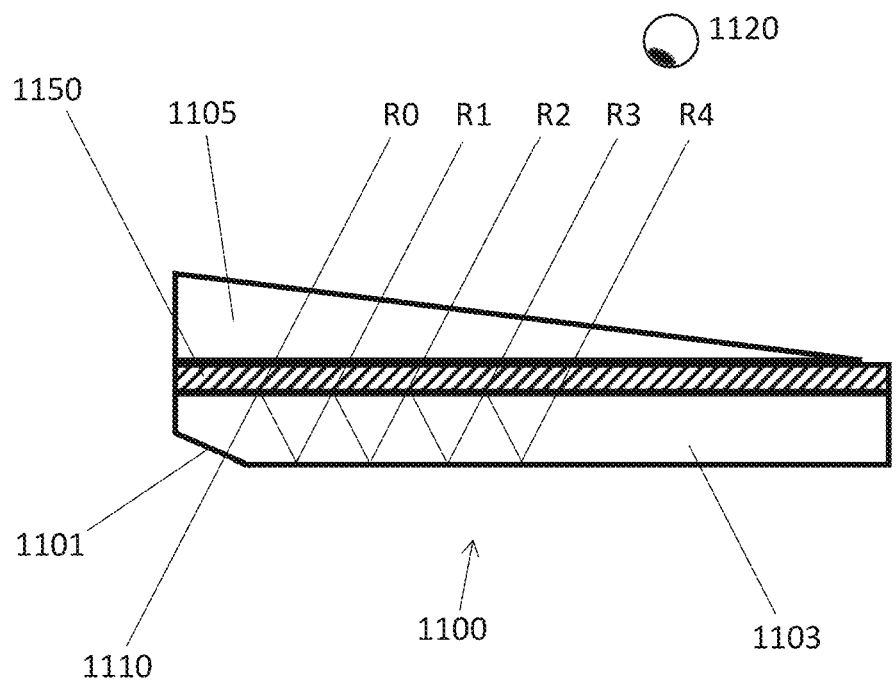
FIG. 11 shows a waveguide comprising a wedge and index matching layer in accordance with embodiments.

An optical wedge 905 abuts the top surface of the slab (upper surface in FIG. 9A). The optical wedge 905 has a refractive index greater than the surrounding medium but less than that of the slab 903. The refractive index of the wedge 905 is sufficient to break the critical angle condition on the top surface of the slab 903 such that a proportion of light is transmitted from the slab 903 into the wedge 905. The angled/wedged top surface of the wedge provides a different (e.g. reduced/lower) angle of incidence which is favourable to transmission rather than reflection. In other words, the angle of incidence on the top surface is such that substantially all the light of the replica escapes from the wedge and contributes to pupil expansion. In some embodiments, normal incidence occurs with the top surface of the wedge. The waveguides shown in FIGS. 9 to 11 are characterised by the use of total internal reflection (rather than reflective surfaces as in FIG. 5) to guide the light and further characterised by the use of a wedge having a lower surface configured to extract light from the top surface of the slab and an upper surface that increases the proportion of light exiting the waveguide. In the embodiment of FIG. 9A, the wedge decreases in thickness with distance from the input port 901. The wedge may increase in thickness with distance from the input port 901. FIG. 9A does not fully illustrate the effects of light refraction in order to preserve simplicity.

Figure 9B:
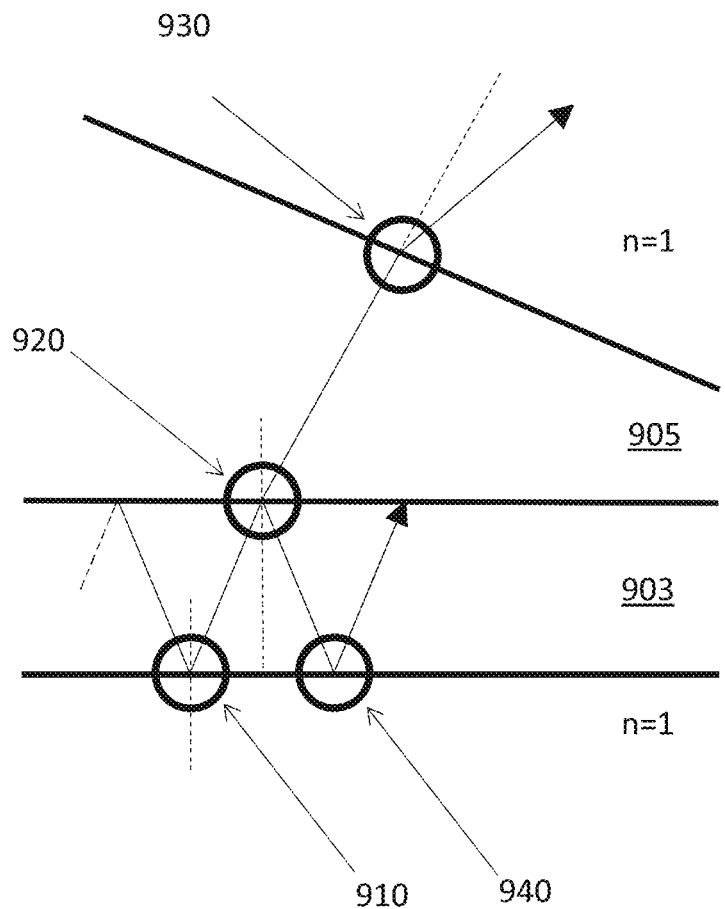
FIG. 9B shows the propagation of light in accordance with a waveguide of the present disclosure.

FIG. 9B shows some of the light interfaces in relation to light propagation within the waveguide of FIG. 9A. A first interface 910 between the high index slab 903 and low index surrounding medium (n=1) satisfies the critical angle condition (i.e. the angle of incidence is equal to or greater than the critical angle between the slab and e.g. air) and is therefore a total internal reflection. The second interface 920 between the slab 903 and medium index wedge 905 does not satisfy the critical angle condition (i.e. the angle of incidence is less than the critical angle between the slab and wedge) because the refractive index of the wedge is sufficient to increase the critical angle beyond the angle of incidence. Light at the third interface 930 between the wedge 905 and low index surrounding medium (n=1) experiences normal incidence (i.e., the angle of incidence on the third interface 930 is zero) and transmission is therefore maximised. In some embodiments, the angle of incidence on the third interface 930 is not zero (normal) but is sufficiently small (i.e. just off normal incidence) such that the proportion of light reflected at interface 930 is negligible. It may be said that the angle of incidence at the third interface is substantially zero. The angle of incidence at the third interface is less than the critical angle between the wedge and e.g. air. The fourth interface shows the next interaction of the light that was not transmitted in the wedge 905 at the second interface 920. The fourth interface 940—again, between the slab and surrounding medium—is also a total internal reflection. In some embodiments, at least one surface of the wedge comprises an antireflection coating.

FIG. 10 shows a further embodiment of a waveguide 1000, in which the upper/top surface is curved, and second surface 1020. The thickness of the wedge 1005a changes with distance from the input port 1001. In some embodiments, the upper surface is concave or convex.

In some embodiments, the refractive index of the wedge 1005a is graded—that is, changes with distance from the input port 1001. Element 1010 illustrates a first interface. In some embodiments, a first side of the wedge 1005a nearest the input port 1001 has a relatively low refractive index (but greater than the surrounding medium) and a second side of the wedge 1005a furthest from the input port 1001 has a relatively low refractive index (but less than the slab 1003). As a result, the difference between the refractive index of the slab 1003 and the refractive index of the wedge 1005a decreases as distance from the input port 1001 increases. This means that, as the distance from the input port 1001 increases and the amount of remaining light diminishes, there will be less reflectance and therefore more transmission at the slab-wedge interface.

In other embodiments such as that shown in FIG. 11, a layer of index matching fluid 1150 (or a corresponding dielectric coating) is sandwiched between the slab 1103 and wedge 1105. The refractive index of the matching fluid 1150 layer is graded—that is, the refractive index of the matching fluid 1150 changes with distance from the input port 1101. The person skilled in the art of optics will understand how a graded index matching fluid may be provided between an optical slab and optical wedge.

In some examples, the refractive index of the slab is 1.5 to 2.5, such as 1.8 to 2.2 and the refractive index of the wedge is 1.1 to 1.9 such as 1.3 to 1.7. The refractive index of the index matching layer may change linearly over the length of the waveguide by a total of 0.2 to 0.8 such as 0.4 to 0.6. The waveguide may comprise a dichroic coating.

In one example, the refractive index of the slab is 2.0+/−0.2, the refractive index of the wedge is 1.5+/−0.2 and the refractive index of the surrounding medium is 1.0+/−0.2. In this example, the (first) critical angle between the slab and air is substantially 30.0 degrees. The (second) critical angle between the slab and wedge is substantially 48.6 degrees and the (third) critical angle between the wedge and air is substantially 41.8 degrees. In some embodiments, the angle of incidence of light within the slab is greater than or equal to the first critical angle and less than the second critical angle. In some embodiments, the second critical angle is less than the third critical angle. In some embodiments, the waveguide and input port are configured such that the angle of incidence of light within the slab is 30 to 42. In some embodiments, the angle of incidence within the slab is 38+/−4 degrees such as 40+/−2 degrees.

Head-Up Display

Figure 12A:
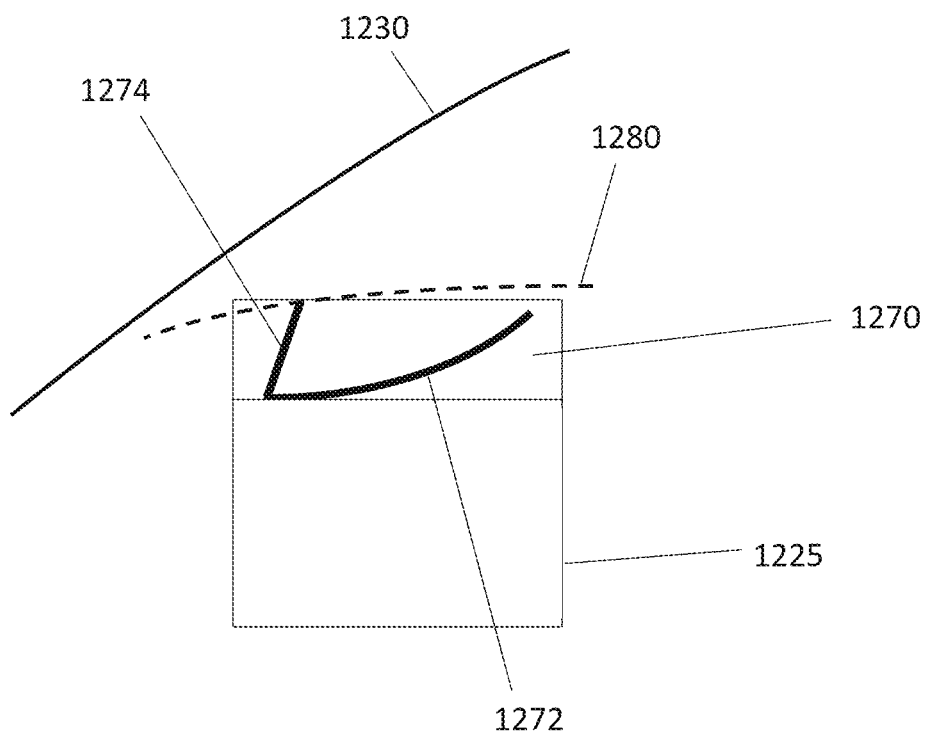
FIGS. 12A and 12B show a head-up display comprising a curved cover glass.

FIG. 12A shows a lower (or first) housing 1225 comprising the optical system of a head-up display in a vehicle having a windscreen 1230 and dashboard 1280. The lower housing comprises at least a picture generating unit and waveguide (not shown in this figure) in accordance with embodiments of the present disclosure. The head-up display includes an upper (or second) housing 1270 containing solar countermeasures. Specifically, the upper housing 1270 comprises a light trap 1274 and a cover glass 1272. The cover glass 1272 is generally curved such as generally parabolic or elliptical. The function of the solar countermeasures may be better understood with reference to FIG. 12B.

Figure 12B:
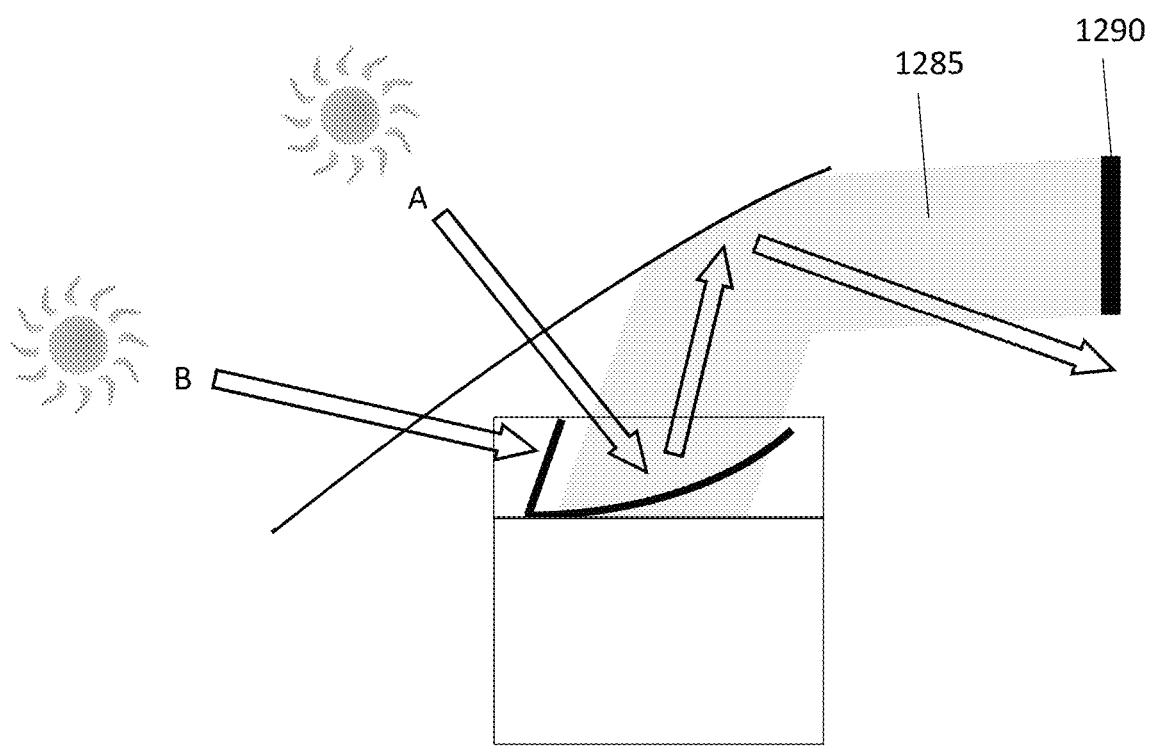

FIG. 12B shows the so-called eye-box 1290 of the head-up display which is the area of space in which the HUD image (e.g. virtual image formed in the windscreen of the picture) may be viewed. If the viewer's eyes are inside the eye-box, the HUD image will be seen. If the viewer's eyes are outside the eye-box, the HUD image will not be seen. The eye-box 1290 is sufficient to accommodate tall and short drivers and allow for normal head movement during driving. FIG. 12B shows a volume 1285 containing light rays from the lower housing 1225 which form the HUD image. FIG. 12B also shows how the cover glass 1272 is curved such that rays of sunlight, such as sunlight ray A, which pass through the windscreen 1230 and reach the cover glass 1272 do not reflect off the inner surface of the windscreen and into the driver's eyes. Conventionally, the curvature of the cover glass 1272 is such that rays of sunlight, such as sunlight ray A, which are reflected off the cover glass 1272 and inner surface of the windscreen are directed downwardly onto the driver's chest area as shown in FIG. 12B. It will be understood that although the reflection off the inner surface of the windscreen may be less than 4% (perhaps even only 0.1% if the windscreen is coated), the peak intensity of sunlight makes these reflections problematic in a HUD. Curving the cover glass 1272 adds manufacturing complexity and adds volume to the HUD.

The second component of the upper housing is the light trap 1274. The light trap 1274 is a physical baffle which shields other components of the HUD from some sunlight. In particular, the light trap 1274 generally shields from relatively shallow sunlight (that is, sunlight when the sun is relatively low in the sky such near sunset—for example, sunlight ray B) such that it does not reach the cover glass 1272.

FIGS. 12A and 12B illustrate how a curved upper surface is conventionally provided by a separate component—frequently called a cover glass—in order to protect a head-up display from sunlight. In some embodiments in accordance with this disclosure, the curved upper surface of the optical wedge of the waveguide is used instead of a curved cover glass to protect the display device. In other words, the curved upper surface of the waveguide functions as the protective cover glass of a head-up display.

ADDITIONAL FEATURES

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the display plane comprises a diffuser surface or screen such as a diffuser. The holographic projection system of the present disclosure may be used to provide an improved head-up display (HUD). In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

In some embodiments, the light received and replicated by the waveguide is unpolarised. In some embodiments, the light is s-polarised and in other embodiments, the light is p-polarised. In some embodiments, the light received and replicated by the waveguide is monochromatic and in other embodiments, the light comprises a plurality of single colour components.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A waveguide pupil expander comprising:
   an optical slab having a first refractive index, $n_1>1$, wherein the optical slab comprises: first and second opposing surfaces arranged in a parallel configuration; and an input arranged to receive light into the optical slab at an angle such that the light is guided between the first and second opposing surfaces by a series of internal reflections;
   an optical wedge having a second refractive index, $n_2$, wherein the optical wedge comprises first and second opposing surfaces arranged in a wedge configuration, such that there is an angle between the first surface and the second surface;
   wherein the optical wedge has a thick end and a thin end; wherein $1<n_2<n_1$;
   wherein the first surface of the optical wedge abuts the second surface of the optical slab to form an interface that allows partial transmission of light guided by the optical slab into the optical wedge at a plurality of points along the interface such that the light is divided a plurality of times, and wherein the angle of the wedge allows light received at the interface to escape through the second surface of the optical wedge such that the exit pupil of the waveguide pupil expander is expanded by the plurality of divisions of the light, and
   wherein the second surface of the optical wedge is curved.

2. A waveguide pupil expander as claimed in claim 1 wherein curved second surface of the optical wedge causes the angle between the first and second opposing surfaces of the optical wedge to change with distance from the input.

3. A waveguide pupil expander as claimed in claim 2 wherein the angle decreases with distance from the input.

4. A waveguide pupil expander as claimed in claim 3 wherein the second surface of the optical wedge forms a concave surface of the waveguide.

5. A waveguide pupil expander as claimed in claim 1 wherein the refractive index of the optical wedge changes with distance from the input.

6. A waveguide pupil expander as claimed in claim 5 wherein the refractive index of the optical wedge increases with distance from the input.

7. A waveguide pupil expander as claimed in claim 1 further comprising an index matching fluid layer sandwiched between the optical slab and optical wedge, wherein the refractive index of the index matching fluid changes with distance from the input.

8. A waveguide pupil expander as claimed in claim 7 wherein the refractive index of the index matching fluid changes increases with distance from the input.

9. A waveguide pupil expander as claimed in claim 1 further comprising an output port arranged to eject light from the optical slab.

10. A display system comprising the waveguide pupil expander of claim 1 and further comprising a picture generating unit arranged to display a pattern, wherein the light received by the input is light of the pattern displayed by the picture generating unit.

11. A display system as claimed in claim 10 further comprising an optical system between the picture generating unit and waveguide pupil expander, wherein the optical system comprising at least one selected from the group comprising: a collimation lens, a pair of lenses arranged to form a telescope such as a de-magnifying telescope and a spatial filter.

12. A display system as claimed in claim 10 wherein the picture generating unit is a holographic projector.

13. A display system as claimed in claim 12 wherein the displayed pattern is a hologram.

14. A display system as claimed in claim 13 wherein the displayed pattern is a holographically-reconstructed picture formed from a hologram.

15. A display system as claimed in claim 14 wherein the holographically-reconstructed picture is formed on a screen such as a diffuse screen.

16. A head-up display comprising the display system as claimed in claim 10 wherein the second surface of the optical wedge forms an angled cover glass or glare trap of the head-up display.

17. A method of pupil expansion, the method comprising:
    receiving light into an optical slab through an input port, wherein the optical slab has a first refractive index, $n_1>1$;
    guiding the light between first and second opposing surfaces of the optical slab by a series of internal reflections, wherein the first and second opposing surfaces are arranged in a parallel configuration;
    dividing the light a plurality of times by forming an interface between a first surface of an optical wedge and the second surface of the optical slab that allows partially transmission of the light into the optical wedge at a plurality of points along the interface, wherein the optical wedge has a second refractive index, $n_2$, and $1<n_2<n_1$, and wherein the optical wedge has a thick end and a thin end, and tapers down in thickness from the thick end to the thin end; and
    arranging the first and a second opposing surface of the optical wedge in a wedge configuration so that light received by the optical wedge through the interface escapes through the second surface of the optical wedge such that the exit pupil of the waveguide pupil expander is expanded by the plurality of divisions of the light; and
    wherein the second surface of the optical wedge is curved.

18. A waveguide pupil expander as claimed in claim 1, wherein the angle between the first and second opposing surfaces of the optical wedge changes, between the thick end and the thin end, with distance from the input.

* * * * *